Sept. 15, 1959
L. D. DE LALIO
2,904,744
MAGNETIC AMPLIFIER
Filed Nov. 22, 1954
3 Sheets-Sheet 1
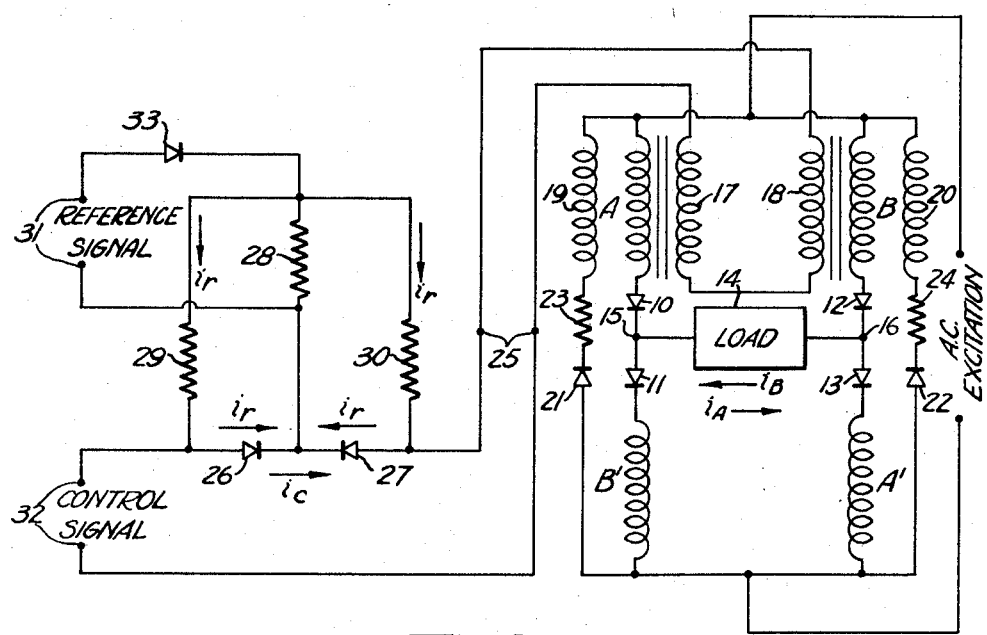
$Fig. 1.$
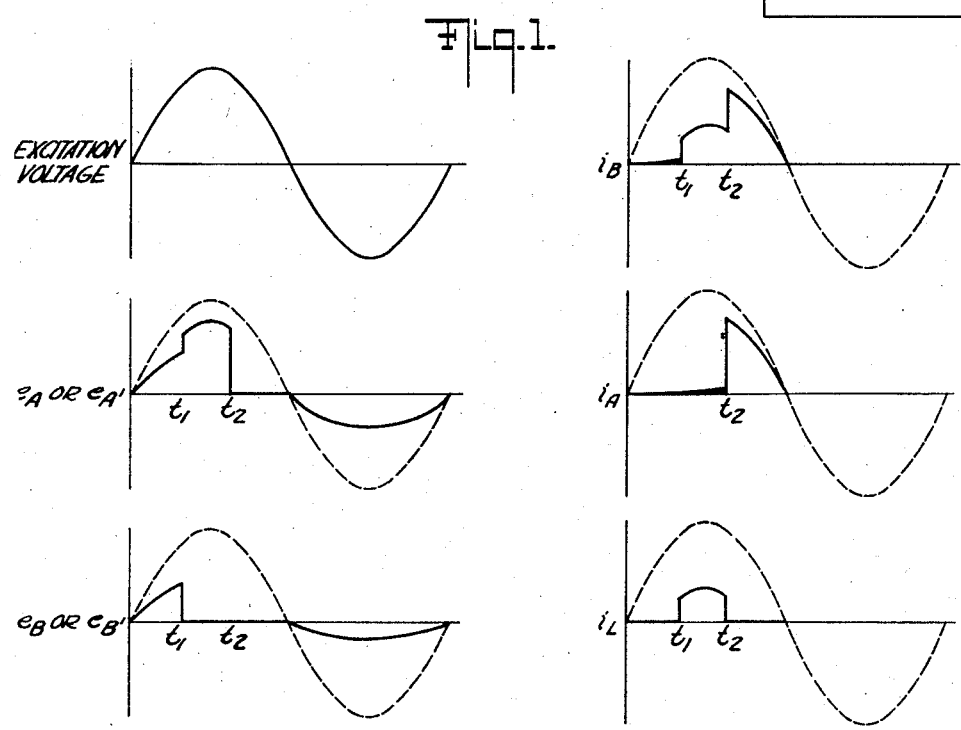
$Fig. 2.$
INVENTOR
LOUIS D. DELALIO
BY
ATTORNEY Sept. 15, 1959    L. D. DE LALIO    2,904,744
MAGNETIC AMPLIFIER Filed Nov. 22, 1954    3 Sheets-Sheet 3

INVENTOR
LOUIS D. DE LALIO
BY
ATTORNEY

United States Patent Office 2,904,744
Patented Sept. 15, 1959

2,904,744

MAGNETIC AMPLIFIER

Louis D. De Lalio, Huntington, N.Y., assignor to Sperry Rand Corporation, a corporation of Delaware Application November 22, 1954, Serial No. 470,209

15 Claims. (Cl. 323—89)

This invention concerns magnetic amplifiers and more particularly is directed to an improvement in a type of so-called self-saturating magnetic amplifier or reactor.

One manner in which self-saturation of the reactors within a magnetic amplifier may be achieved is to serially connect a uni-directional current device in circuit with each load winding to block the flow of demagnetizing current. A control winding is usually wound in magnetic flux relation to each load winding, and the several control windings are connected together in a series arrangement to accept a control signal by which the flow of load currents in the load windings may be made to respond accordingly.

It is evident that a changing magnetic field caused by the flow of currents in the load windings will induce potentials in the control windings magnetically linked thereto. During the flow of load currents through the load windings, saturation has been achieved, and there is therefore little or no change in the magnetic field due to the flow of load currents. However, before saturation is reached, magnetizing currents flow in the load windings, and there is a changing magnetic field produced about the load windings with the result that a potential is induced in each control winding wound in magnetic fluix relation to a load winding.

In full-wave self-saturating magnetic amplifiers, if control is achieved through the use of direct current or another source of fixed polarity magnetic bias, the control windings may be arranged and interconnected with respect to the load windings so as to effect mutual cancellation of the potentials induced in the control windings by the flow of magnetizing currents through the load windings. In full-wave self-saturating magnetic amplifiers which utilize alternating current to effect control, a cancellation potential may be developed by the flow of load currents, which potential may be impressed upon the control circuit in an appropriate manner to effect cancellation of the unwanted potentials induced in the control windings by the flow of magnetizing currents through the load windings.

Copending applications Serial No. 435,497, now Patent No. 2,812,392, and Serial No. 435,483, both filed in the name of Eino W. Lehtonen, disclose the method and means for generating and utilizing such cancellation potentials in improved self-saturating magnetic amplifiers of single-ended and push-pull types, respectively.

The present invention is directed to the elimination of unwanted effects due to uncancelled induced potentials in the control circuit of a half-wave magnetic amplifier which does not readily lend itself to the generation of suitable cancellation potentials in the manner taught and disclosed in the two copending applications previously alluded to herein.

It is therefore the principal object of the present invention to eliminate the undesirable circulating currents due to potentials induced in the control windings of a half-wave self-saturating type of magnetic amplifier.

The half-wave type of magnetic amplifier to which the invention is directed may employ either direct current control or alternating current control. However, due to the fact that this type of magnetic amplifier is restricted to half-wave operation, the unwanted induced potentials are not mutually cancelled as they usually are in the full-wave type of magnetic amplifier utilizing direct current control. Nor does this type of half-wave magnetic amplifier when utilizing alternating current control have its series connections between the control windings reversed as compared to direct current control, in a manner analogous to the full-wave self-saturating magnetic amplifier such as that disclosed in applications Serial No. 435,497 and Serial No. 435,483 which employ alternating current control. This is so because the present type of magnetic amplifier, though adapted to alternating current control, utilizes only a half-wave of the alternating current applied to the control circuit and therefore may be said to be virtually direct current controlled when the fact is considered that only a half-wave of the alternating current of a single polarity is effective to achieve the desired control.

The present invention eliminates undesired circulating currents in the control circuit due to potentials induced therein by the flow of magnetizing currents in the load circuits, by effectively rendering the control circuit an open circuit so that such undesired currents cannot circulate. The control circuit is rendered an open circuit during each firing half-cycle of the saturable reactors. This is acocmplished by appropriate synchronization with the excitation source supplying power to the load windings of the magnetic amplifier and the load. Since the magnetizing currents flow during the firing half-cycle of the half-wave magnetic amplifier, the flow of circulating currents due to unwanted induced potentials in the control windings is effectively prevented during that period of one half-cycle.

The manner in which this is achieved as well as other features and important aspects of the present invention may be more readily understood from the accompanying despcription and explanation of the operation of the several embodiments shown in the accompanying drawings in which:

Fig. 1 is a preferred embodiment of the present invention;

Fig. 2 is a series of waveforms of the potentials and currents involved in the operation of the present invention.

Figure 3:
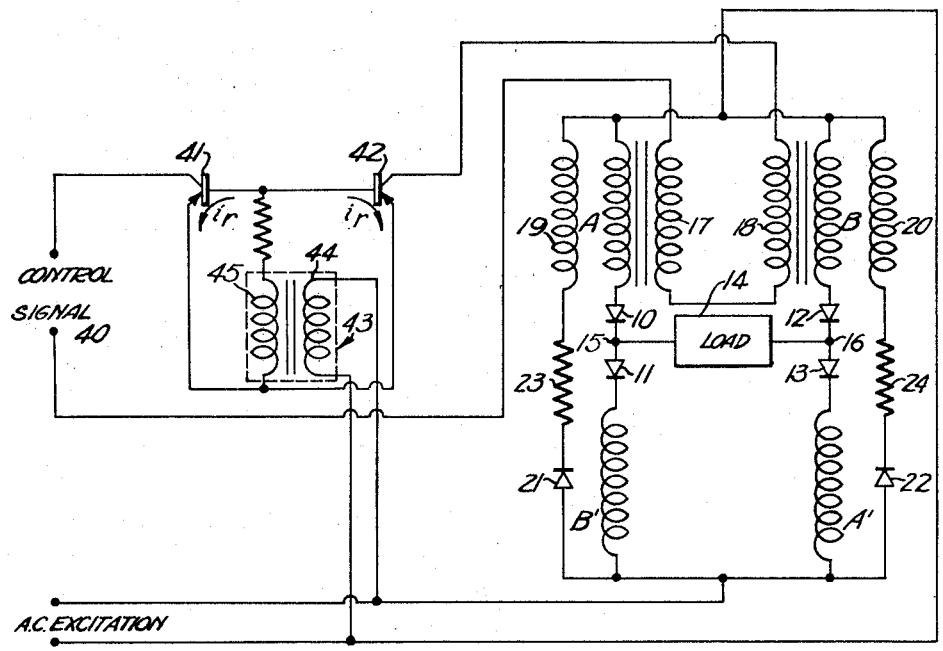
Figs. 3, 4, 5 and 6 are additional embodiments of the present invention.

The operation of the type of magnetic amplifier to which the present invention is directed will first be described when such a magnetic amplifier is operating without the improvements afforded by the present invention so that an appreciation may be had of the problems posed prior to this invention.

Referring to Fig. 1, it may be seen that two pairs of load windings, such as A and B' and B and A', are connected in a series relation to each other within each pair and across a source of alternating current excitation. Each load winding has serially connected to it a unidirectional device such as the rectifier 10 serially connected with load winding A, rectifier 11 serially connected with load winding B', rectifier 12 serially connected with B, and rectifier 13 serially connected with load winding A'. A load 14 is connected in symmetrical arrangement between load windings A and B' at one terminal 15 and load windings B and A' at the other terminal 16. Windings A and A' are wound so as to be in magnetic flux linkage. Similarly, windings B and B' are wound so as to be in magnetic flux linkage. Two control windings 17 and 18 are also wound in magnetic flux linkage with load windings A and B, respectively. The control windings 17 and 18 are serially connected together and arranged to accept either an alternating current or a direct current control signal so as to control the point at which the reactors achieve saturation and begin to pass load current to the load.

Bias windings 19 and 20 are wound in magnetic flux linkage to load windings A and B, respectively, and are connected across the source of alternating current excitation. Unidirectional current devices 21 and 22 are serially connected in circuit with the bias windings 19 and 20, respectively, and the unidirectional devices 21 and 22 are of opposite polarity to the unidirectional devices previously mentioned, i.e., 10, 11, 12 and 13. This arrangement allows a current to flow through the bias windings 19 and 20 which is opposite to the direction of the load currents so that the magnetization of the load windings may be "preset" during the non-firing half-cycle of the load windings. Resistors 23 and 24 are serially connected in the bias circuits so as to limit the flow of bias currents to an appropriate value sufficient to achieve the bias function.

Assuming that no control is applied to the magnetic amplifier, its operation under those conditions will now be explained. It will be recalled that load windings A and A' are linked in magnetic flux linkage with each other, as also are load windings B and B'. Since the same alternating current excitation is impressed across both pairs of load windings and the unidirectional devices respectively associated therewith are all of like polarity, load windings A and A' will cause the reactor associated therewith to become magnetically saturated at precisely the same instant at which the reactor associated with load windings B and B' becomes magnetically saturated. In other words, load windings A and B' which are serially connected across the source of alternating current excitation will cause their respectively associated reactors to reach saturation at the same time. Load windings B and A' will reach saturation at the same time as each other and also at the same time as load windings A and B'. The increased currents which flow after saturation or "firing" will therefore flow through the load windings A and B', and through B and A' at the same time and have an identical period of duration.

Throughout this disclosure the "saturation" of load windings, their associated reactors, and other windings in magnetic flux linkage therewith will be spoken of in an interchangeable sense to simplify and facilitate the disclosure. It is realized that the "saturation" of windings is not a technically precise term unless the import is that the core of the reactor is saturated also. This is the intendment of that term as used herein.

During the flow of currents after saturation, the voltage drop across load winding A is equal to the voltage drop across load winding B and therefore the midpoint junctions 15 and 16 are equipotential. Consequently, no potential difference is impressed across the load and no load current is caused to flow.

Viewed from another aspect, it might be said that equal load currents flow in opposite directions through the load, and therefore, there is no sum total of resultant current flow. This condition of no load current flow is changed, however, when a control signal is applied to terminals 25, for instance, so as to cause control current flow through control windings 17 and 18.

Assuming that a direct current control signal is applied to terminals 25, a direct current will flow through control windings 17 and 18 so as to advance the point of saturation of one load winding such as B, for instance, and retard the point of saturation of the other load winding, such as A, for instance. Since load windings B' and A' are magnetically linked with load windings B and A, respectively, these windings also reach saturation at the same time as the load winding with which they are respectively magnetically linked.

Under these conditions then, current will begin to flow through load windings B and B' prior to the time that current flows through load windings A and A' because the former reach magnetic saturation sooner.

It may therefore be seen that there will be a current $i_B$ flowing through the load winding B, the load 14, and load winding B' from the point of time at which those windings reach saturation and throughout the duration of that half-cycle. At a later time during the same half-cycle, load windings A and A' reach saturation with the result they conduct increased current for a lesser period during the firing half-cycle. A current $i_A$ flows through load winding A, the load 14 and load winding A'. These currents are substantially equal and opposite in direction of flow. Therefore, during the period when they are both flowing, there is a cancellation of the two since they are mutually opposing each other in the load 14. However, during the period of time which elapses from the point at which the first pair of windings reach saturation until the second pair of windings reach saturation, there is a current flow in one direction which is the net load current, $i_L$.

These relations may be better understood by reference to Fig. 2 wherein the first waveform shows a typical excitation voltage which may be applied across the magnetic amplifier. This potential is illustrated to be substantially of sinusoidal form and it is usually so in practice, though this particular form of excitation is not a necessary condition for operation of the magnetic amplifier in accordance with the invention. The second waveform shows the potential which is developed across load winding A as related to the A.C. excitation shown in dotted form. The third waveform illustrates the potential developed across load winding B as related to the excitation potential, also shown in dotted form. The fourth waveform illustrates the currents which are caused to flow in load windings B and B', while the fifth waveform illustrates the currents caused to flow in load windings A and A', and the sixth waveform illustrates the net load current caused to flow through the load 14.

Referring now to the second waveform of Fig. 2, it may be seen that from the beginning of the firing half-cycle until a time $t_1$ when the load windings B and B' become saturated, approximately one-half of the sinusoidal excitation voltage is developed across load winding A. The remainder of course is developed across load winding B' which may be seen by reference to the third waveform. The time between $t_1$ and $t_2$, as illustrated in several of the waveforms, indicates that period which elapses from the time that load windings B and B' reach saturation, until load windings A and A' reach saturation. Consequently, at the time $t_1$, the potential developed across load winding A increases as shown in the second waveform of Fig. 2, and the potential developed across load winding B simultaneously decreases sharply, as shown in the third waveform of Fig. 2.

The potentials $e_A$ and $e_B$ during the negative or non-firing half cycle are shown as being of a sine waveform. These waveforms are the control potentials which "preset" the respective reactors to determine their saturation points. These waveforms are of idealized configuration since the actual waveform would depend upon circuitry, materials and the applied waveforms. However, $e_A$ and $e_B$ during this non-firing half-cycle are unequal whenever the control signal is not zero. The inequality during this half cycle does not lead to undesirable effects because this inequality is imposed upon these windings by the signal source and is a measure of the effectiveness of the control signal.

The relationship of the current flow in the magnetic amplifier may be seen by reference to the fourth waveform of Fig. 2 wherein a very small magnetizing current flows during the time from the beginning of the firing half-cycle until $t_1$ when load windings B and B' become saturated. At this point of time a current having a configuration substantially conforming to a part of a sine wave begins to flow and continues until the point of time $t_2$ is reached. Thereafter a greatly increased amount of current, as shown in the fourth waveform of Fig. 2, is caused to flow through load winding B because the load winding A' which is in series with it across the A' excitation reaches saturation at $t_2$, and there is therefore less impedance offered and a consequent increase of current. The fifth waveform illustrates the current flow through load windings A and A', and it may be seen that a very small magnetizing current flows until the point of time $t_2$ when load windings A and A' reach saturation and a current $i_A$ is caused to flow having substantially the same waveform as that of a current $i_B$ after the point of time $t_2$.

As has been previously explained, currents $i_A$ and $i_B$, when they are both flowing, are substantially equal in amplitude and of like configuration. Because these two currents flow in opposite directions, a portion of one current is mutually cancelled by the other, leaving a net load current of $i_L$ having the general configuration, duration and timing of the sixth waveform illustrated in Fig. 2.

It may be readily appreciated that during the time when only magnetizing currents are flowing through the load windings, there is a considerable change in flux linkages about the load windings and therefore, a potential is induced in the control windings. Before time $t_1$, these potentials cancel, but between times $t_1$ and $t_2$ they are not cancelled. This uncancelled potential causes circulating currents to flow which impede the regulation of the magnetic amplifier and render the control signals less effective to achieve their desired results. The uncancelled portion of the potential induced in the control windings by the flow of magnetizing currents in the load windings is therefore unwanted and undesirable.

The present invention conceives rendering the control circuit a virtual open circuit during the firing half-cycle of the magnetic amplifier so that the undesirable and troublesome effects of circulating currents due to uncancelled induced potentials in the control windings may be eliminated.

In some embodiments of the invention, the control circuit is actually interrupted so as to literally be an open circuit. In other embodiments of the invention, the control circuit is so regulated that it offers an extremely high impedance to the flow of currents therein during the firing half-cycle of the magnetic amplifier, whereby the control circuit may be considered to be for practical purposes a high impedance path comparable to that of an open circuit. This will appear more fully from the explanation of the operation of the invention in the several embodiments disclosed hereinafter.

Referring to Fig. 1, there is illustrated a regulating circuit operably connected with the control circuit. A portion of the control circuit has oppositely poled unidirectional devices 26 and 27 serially connected therein. To the common connection between unidirectional devices 26 and 27, a resistor 28 is connected. Resistor 28 is also connected so as to receive a reference signal thereacross. A resistor 29 is connected from one side of resistor 28 to the other side of one of the unidirectional devices 26. Similarly, resistor 30 is connected from one side of resistor 28 to the other side of the unidirectional device 27. The reference signal which is applied to terminals 31 should be in synchronism with the alternating current excitation potential applied across the magnetic amplifier. The control signal applied to terminals 32 may be either direct current or alternating current.

Assuming for purposes of explanation that a direct current control signal is applied to terminals 32 which will produce a control current flow $i_c$ in the direction indicated in Fig. 1, it may be seen that such flow of control current would ordinarily be blocked by the unidirectional current device 27. However, during the non-firing half-cycle of the magnetic amplifier, when the control current is effective to preset the magnetization of the load windings, a reference signal is applied to terminals 31 so as to develop a potential across resistor 28 of such polarity as to cause currents $i_r$ to flow through resistors 29 and 30 and unidirectional devices 26 and 27 as indicated by the arrows in Fig. 1. The reference current $i_r$ flows through unidirectional device 27 in a direction opposite to that of the control current $i_c$ with the net result that there is at least partial cancellation of the two immediately across unidirectional device 27, but the control current $i_c$ is allowed to flow through the control circuit and performs its function of presetting the load windings of the magnetic amplifier.

During the firing half-cycle of the magnetic amplifier, the reference signal applied to terminals 31 does not cause the same current flow of $i_r$. The oppositely poled unidirectional devices 26 and 27 in this state constitute an extremely high impedance which blocks the flow of circulating currents in the control circuit such as those which may be caused by unwanted potentials induced therein by the flow of magnetizing currents during the firing half-cycle of the magnetic amplifier. The unidirectional current devices are fundamentally therefore non-linear resistances which offer varying impedance to the flow of control current therethrough in accordance with the reference current flowing.

Rectifier 33 is not theoretically essential to the operation of this embodiment of the invention, nor is resistor 28. This arrangement however affords practical advantages. Rectifier 33 and resistor 28 together transfer the negative polarity voltage of an alternating reference signal from unidirectional devices 26 and 27 to unidirectional device 33. This permits unidirectional devices 26 and 27 to be rated for lower voltages and lower voltage rectifiers usually have less forward resistance. By reducing the voltage on unidirectional devices 26 and 27, the effects of different reverse resistances in unidirectional devices 26 and 27 are minimized. Note that unidirectional devices 26 and 27, together with resistances 29 and 30, form a bridge and if unidirectional devices 26 and 27 do not offer equal impedances, a potential will exist in the control circuit causing an unbalance. Resistor 28 insures that the reverse impedance of 33 is the larger component of the total impedance during the reverse half-cycle of the regulating reference signal.

The reference signal applied to terminals 31 may be an alternating current signal in synchronism with the alternating current excitation applied to the magnetic amplifier and of appropriate phase relationship to cause it to operate in the manner described. Such a reference signal must cause the flow of a reference current $i_r$ of equal or greater magnitude than the control current $i_c$ so as to allow the control current $i_c$ to be fully effective. If an insufficient magnitude of reference current $i_r$ is flowing during the non-firing half-cycle of the magnetic amplifier, the magnitude of control current $i_c$ can be no greater than the magnitude of the reference current $i_r$ for the reason that the amount by which control current $i_c$ exceeds the reference current $i_r$ will be blocked by the unidirectional devices 27.

The magnitude of the reference potential is usually quite large as compared to the magnitude of the control signal, and elements 29 and 30, which are each of a relatively high resistance, offer a series impedance to the flow of control current. By contrast, the same elements 29 and 30 offer a parallel impedance to the flow of reference current and this arrangement coupled with the difference in amplitude between the control signal and the reference signal results in a considerable flow of reference current during the non-firing half-cycle, but there is virtually no flow of control current in the control circuit during the firing half-cycle.

The control signal applied to terminals 32 may be a direct current signal or it may be an alternating current signal in which case only a half-wave of the alternating current signal is effective to preset the magnetization of the load windings and therefore determine their saturation point and the time at which they will fire. A reversal in the polarity of a direct current control signal applied to terminals 32 will reverse the order in which the respective pairs of magnetically linked load windings fire with the result that the net load current $i_L$ caused to flow through the load 14 will reverse its direction. Similarly, an alternating current control signal applied to terminals 32 which is changed 180° in phase will change the direction of the net current flow $i_L$ through the load 14.

The embodiment of Fig. 3 operates in substantially the same manner as that of Fig. 1 insofar as the components of the basic magnetic amplifier are concerned. Similar components of Fig. 3 therefore bear the same numerical designation as in Fig. 1. However, it may be seen that the control signal is applied to the terminals 40 which are connected to the control windings 17 and 18 and two oppositely poled transistors 41 and 42 are serially connected in the control circuit.

Looking into the circuit from the terminals 40, the control signal sees oppositely poled transistors 41 and 42 which offer high impedance of such value that the control signal will not of itself cause an effective control current to flow. The alternating current excitation applied to the magnetic amplifier is connected across the primary winding 43 of a transformer 44. The secondary winding 45 of the transformer 44 is connected in circuit with transistors so as to cause reference currents $i_r$ to flow in parallel paths during the non-firing half-cycle of the magnetic amplifier as illustrated in Fig. 3. Since the currents $i_r$ flow in the directions indicated in Fig. 3 through the transistors 41 and 42, a control signal $i_c$ is allowed to flow in the opposite direction to the reference current $i_r$ flowing through one of the transistors, such as 41, for instance. Thus the embodiment of Fig. 3 allows control current $i_c$ to flow during the non-firing half-cycle of the magnetic amplifier and to preset the magnetization of the load windings so as to control the firing point thereof in much the same manner as the embodiment of Fig. 1, though a different arrangement and combination of apparatus is utilized to achieve the desired results.

Figure 4:
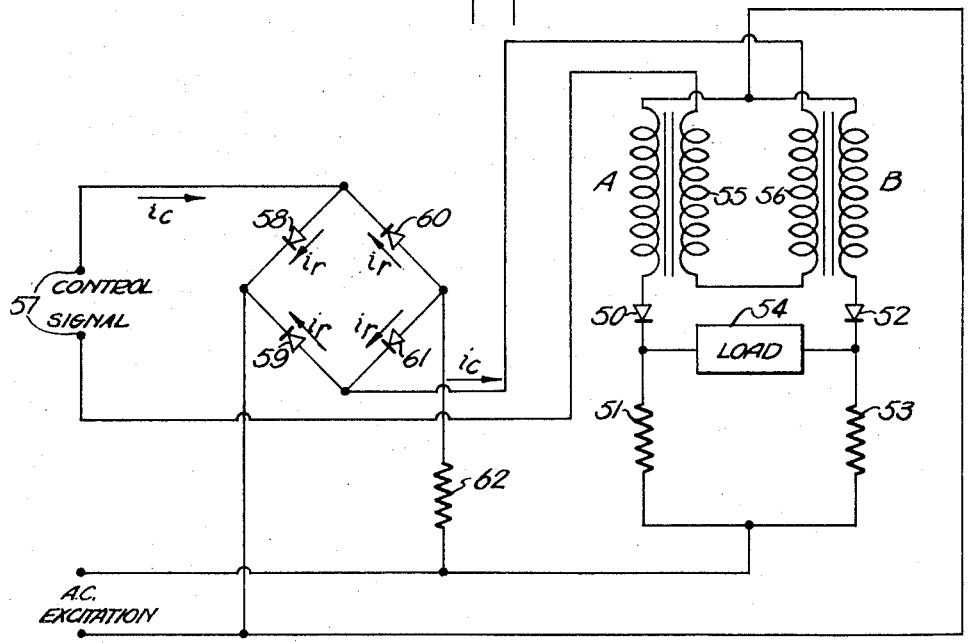

The embodiment of Fig. 4 includes two load circuits in parallel connection across the alternating current excitation source. Each load circuit is comprised of a load winding, a unidirectional device and a resistance. Load winding A is connected serially to a unidirectional device 50 and is also serially connected to a resistance 51. Load winding B is connected to unidirectional device 52 and also serially connected to resistance 53. The load 54 is connected from the junction between unidirectional device 50 and resistance 51, to the junction between unidirectional 52 and resistance 53. Control windings 55 and 56 are wound in magnetic flux linkage to load windings A and B, respectively, and are arranged and adapted to control the magnetization of the load windings during a non-firing half-cycle of the operation of the magnetic amplifier in much the same manner as the embodiment illustrated by Fig. 1.

The fundamental operation of the embodiment of Fig. 4 is as follows. Without a control signal applied to control windings 55 and 56, load windings A and B reach saturation at the same instant of time and consequently conduct heavy current at the same instant of time with the result that the points in the load circuits across which the load 54 is connected are always equipotential and no current flows through load 54. However, if the saturation point of load winding A is advanced while the saturation point of the load winding B is retarded by the application of an appropriate direct current or alternating current control signal to the control windings 55 and 56, an increased current flows through load winding A and resistance 53 before a like amplitude of current flows through load winding B and resistance 51. The result is that during the period of time between the two respective points of saturation of load windings A and B, there is an actual flow of net load current through load 54.

The control circuit in the embodiment of Fig. 4 is arranged so that the control signal impressed upon terminals 57 will be developed across a symmetrical bridge comprised of four unidirectional devices 58, 59, 60 and 61. The source of alternating current excitation applied to the magnetic amplifier is applied through a resistor 62 of relatively high resistance and across the remaining pairs of opposite junctions of the bridge. The unidirectional devices 58, 59, 60 and 61 are so arranged with respect to polarity that current may flow through parallel paths of the bridge comprising unidirectional devices 60 and 58 and another pair comprising unidirectional devices 61 and 59. However, the polarity of the unidirectional devices and the bias impressed upon them by the reference signal is such with respect to the control signal that no control current may flow unless a reference current flows.

Thus it may be seen that the arrangement of apparatus as illustrated in Fig. 4 affords synchronization of the reference current flow by the expedient of taking the reference signal from the same source as the alternating current excitation which supplies power to the magnetic amplifier. The control current $i_c$, having a direction of flow as shown by the arrows in Fig. 4, may only therefore flow during the period when the reference current $i_r$ is flowing. When no reference current $i_r$ is flowing, the control circuit offers an extremely high impedance to the flow of any currents therein because of its oppositely poled unidirectional devices and reverse biasing. The control circuit during the firing half-cycle is therefore virtually an open circuit in effect, preventing the flow of circulating currents therein such as those which may result from the unwanted potentials induced in the control windings 55 and 56 by the flow of magnetizing currents in the load windings A and B.

The time and phase relationships of the magnetizing current flow, the load current flow, control current flow, and reference current flow are substantially the same in the embodiment of Fig. 4 as the analogous relationships in previously described embodiments. Bias windings similar to those employed in the embodiments illustrated in Fig. 1 and Fig. 3 may be employed in the apparatus of Fig. 4.

Figure 5:
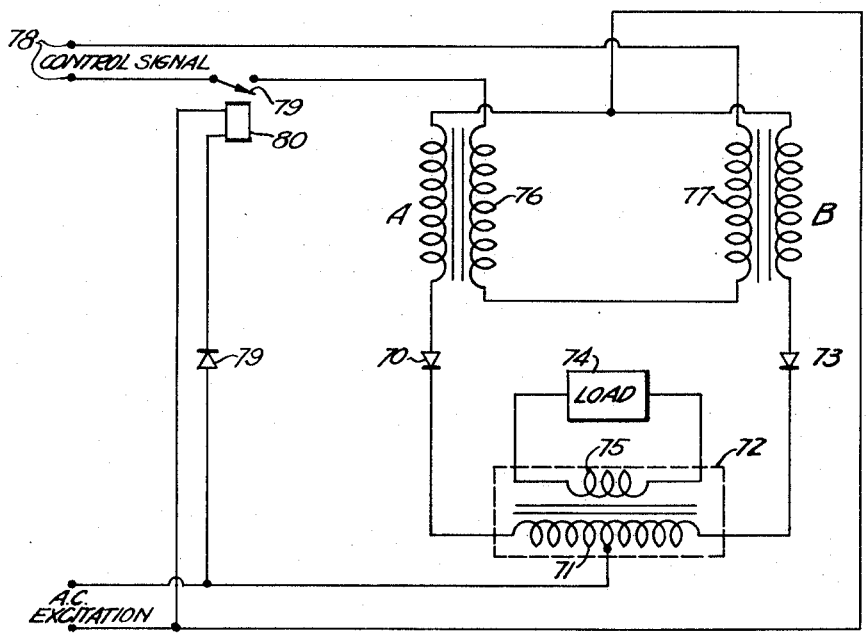

The embodiment of Fig. 5 illustrates a magnetic amplifier in which two load circuits are connected to the primary winding 71 of a transformer 72, which winding has a center tap connected to one side of the alternating current excitation source. The other sides of the load circuits are also connected to the alternating current excitation source. Each load circuit comprises a load winding and a unidirectional device serially connected between the load winding and the center tapped primary winding of the transformer previously mentioned. The load winding A, for instance, is serially connected to unidirectional device 70 which in turn is connected to one end of the primary winding 71 of the transformer 72. Similarly, load winding B is serially connected to a unidirectional device 73 which in turn is connected to the other end of the center tapped primary winding 71 of the transformer 72. A load 74 is connected across the secondary winding 75 of the transformer 72. Two control windings 76 and 77 are wound in magnetic flux relation to load windings A and B, respectively. The control windings 76 and 77 are serially connected to accept a control signal at terminals 78 and a switch 79 is interposed in one of the connecting leads of the control circuit. The switch 79 is positioned so as to be actuated by a relay device 80. The relay device 80 is connected across the source of alternating current excitation and actuates the switch 79 in synchronism with the alternating current excitation applied to the magnetic amplifier.

When no control signal is applied to the magnetic amplifier in Fig. 5, load windings A and B both reach saturation at the same instant of time and therefore equal and opposite currents flow through the respective halves of the secondary winding 71 of transformer 72 to the center tap. Thus no potential is induced in the secondary winding 75 of transformer 72 and no load current flows through the load 74.

However, when an appropriate control signal (which may be either a direct current or alternating current) is applied to terminals 78 with switch 79 closed, the time of saturation and firing point of one load winding is advanced while the other is retarded. Thus a greatly increased amplitude of current will begin to flow through one load winding and through one-half of the center tapped primary winding of transformer 72 before a current of like amplitude will flow through the other half of primary winding 71 of transformer 72. During that period of time when substantial currents flow through only one-half of the primary winding 71 of transformer 72, a potential will be induced in the secondary winding 75 which will cause a load current to flow through load 74.

The point at which the load windings fire is preset by the flow of control current in the control circuit during the non-firing half-wave period of the magnetic amplifier's operation and therefore switch 79 is closed during that period. However, during the firing half-wave period of the magnetic amplifier's operation, the current flowing through relay 80 is such that opens switch 79 so as to prevent the flow of circulating currents in the control circuits.

The apparatus of Fig. 5 therefore operates to interrupt the continuity of the control circuit during the firing half-wave period to achieve suppression of the circulating currents caused by the unwanted and undesirable potential induced in the control windings due to the flow of magnetizing currents in the load windings.

Thus it may be seen that the apparatus of Fig. 5 achieves the same results as the other embodiments disclosed herein in accordance with the broad concept of the invention but by use of a different combination of apparatus. Bias windings similar to those disclosed in connection with other embodiments may also be employed with the apparatus of Fig. 5.

Figure 6:
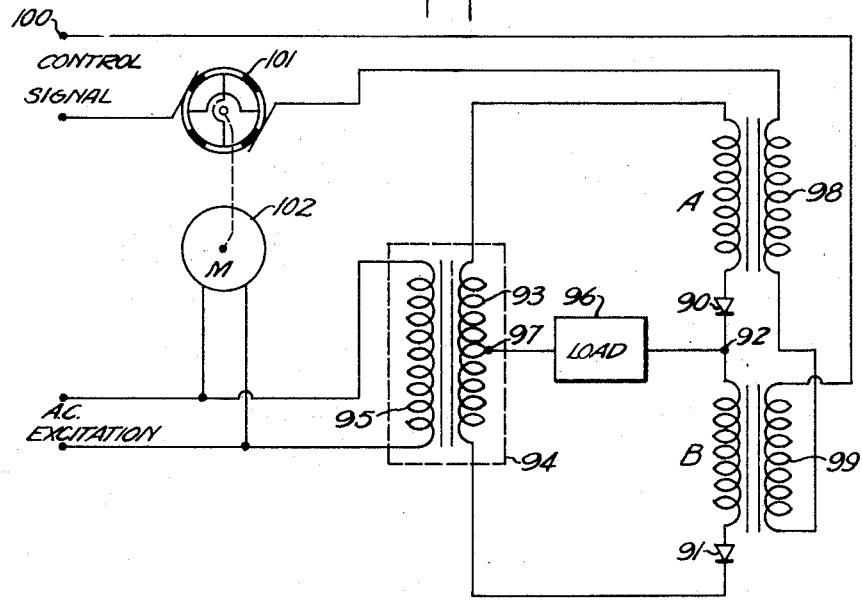

Fig. 6 illustrates a half-wave magnetic amplifier which comprises two load circuits, each of which includes a load winding and a unidirectional device. The alternating current excitation is applied to the magnetic amplifier of Fig. 6 through the inductive coupling of transformer. The load winding A is serially connected to a unidirectional device 90 and load winding B is similarly connected in series with a unidirectional device 91. The two load circuits are connected together at a junction 92 and both are connected across the secondary winding 93 of a transformer 94. The alternating current excitation is applied to the primary winding 95 of the transformer 94 and a load 96 is connected from the center tap 97 of the secondary winding 93 of transformer 94 to the junction 92 between the two load circuits.

The operation of the apparatus of Fig. 6 is such that the alternating current excitation induced in the secondary winding 93 of transformer 94 causes saturation of the load windings A and B at the same instant of time when no control signal is applied to the control windings 98 and 99. Thus the points 97 and 92 are equipotential and no load current flows through the load 96. However, the application of an appropriate control signal (which may be either alternating current or direct current) to the control windings 98 and 99 will advance the firing of one load winding in point of time with respect to the firing of the other load winding in point of time.

Thus a considerably greater amplitude of current will be caused to flow through one load winding before a similar amplitude of current flows through the other load winding. There is therefore a difference of potential between points 97 and 92 which causes a load current to flow through the load 96. The control windings 98 and 99 are connected to a source of control signal which is applied to terminals 100. Interposed in one of the control circuit connections is a commutator 101. The commutator 101 is arranged and connected internally so as to complete the circuit during discrete portions of each revolution and interrupt the circuit during the remaining portions of each revolution.

A motor 102 is operably connected to drive the commutator 101 and receives its motive power from the same source of alternating current excitation which supplies power to the magnetic amplifier. The motor 102 is therefore driven at a speed which is synchronous with the alternations of the source of power supplied to the magnetic amplifier and the speed of the motor 102 is such that together with the number of commutator segments of the commutator 101, will complete the continuity of the control circuit during the non-firing half-cycle period of operation of the magnetic amplifier and will interrupt the continuity of the control circuit during the firing half-cycle period of operation of the magnetic amplifier. The commutator 101, as synchronously driven by the motor 102, therefore prevents the circulation of currents in the control circuit due to unwanted and undesirable potentials induced in the control windings by the flow of magnetizing currents in the load windings during the firing half period of operation of the magnetic amplifier.

The embodiment of Fig. 6 may utilize bias windings in the manner similar to those employed in other embodiments disclosed hereinbefore.

From the drawings and description herein it may be seen that the various types of synchronized switching means shown in Figs. 1, 3, 4, 5 and 6 are symmetric in that, when closed or conductive, they are conductive in both directions to allow control current flow of either polarity through the control windings.

It should also be borne in mind that self-saturation of the load windings of the magnetic amplifiers in the several embodiments disclosed need not necessarily be achieved through the use of unidirectional devices connected in the manner illustrated herein.

Moreover, the practice of the present invention is not limited by any particular method employed to effect self-saturation and it will be evident to those skilled in the art that a means of effecting self-saturation is necessary to the practice of the present invention only insofar as the inventive concept is directed to the solution of a problem peculiar to self-saturation phenomenon. Therefore, any acceptable means of effecting self-saturation may be employed without departing from the spirit or scope of the present invention.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A self-saturating magnetic amplifier including two saturable reactors arranged and connected to supply half-wave power to a load from an alternating current source, a control winding wound in magnetic flux relation to each said saturable reactor, a source of control signal connected to said control windings, a pair of high value linear resistances connected in series between said control signal and said control windings, a pair of non-linear resistances connected in shunt to said linear resistances in a bridge arrangement, said non-linear resistances being of relatively high impedance when not conducting, a source of reference signal having the same frequency as said power source, said reference signal being connected across the junctions intermediate said respective pairs of resistances for causing current flow therethrough only during each non-firing half-cycle of said reactors, whereby said control signal presets the flux density of said reactors during their non-firing half-cycle and said bridge is rendered substantially non-conductive during each reactor firing half-cycle.

2. A self-saturating magnetic amplifier including two saturable reactors arranged and connected to supply half-wave power to a load from an alternating current source, a control winding wound in magnetic flux relation to each said saturable reactor, a source of control signal connected to said control windings, a pair of high value linear resistances connected in series between said control signal and said control windings, a pair of oppositely poled unidirectional current devices connected in shunt to said resistances, a source of reference signal having the same frequency as said power source, said reference signal being connected across the junctions intermediate said pair of unidirectional devices and said pair of resistances, for causing current flow therethrough only during each non-firing half-cycle, whereby a relatively low impedance is offered to the flow of control current during each non-firing half-cycle of said reactors and said bridge is rendered substantially non-conductive during each firing half-cycle of said reactors.

3. A self-saturating magnetic amplifier including two saturable reactors arranged and connected to supply half-wave power to a load from an alternating current source, a control winding wound in magnetic flux relation to each said saturable reactor, a source of control signal, a reference signal of the same frequency as said power source, a bridge network of rectifiers connected to receive said reference signal across a pair of opposite junctions, said rectifiers being poled so as to be conductive for one half-cycle of said applied reference signal, said remaining opposite pair of junctions being connected to said source of control signal and said control windings, respectively, whereby said control signal presets the flux density of said reactors during each non-firing half-cycle of said reactors and said bridge is rendered substantially non-conductive during each firing half-cycle of said reactors.

4. A self-saturating magnetic amplifier including two saturable reactors arranged and connected to supply half-wave power to a load from an alternating current source, a control winding wound in magnetic flux relation to each said saturable reactor, a control circuit including in series a source of control signal, a variable symmetric impedance network capable of being alternatively rendered a high or a low symmetrical impedance, and each of said control windings for supplying control current through the control windings in series, and means for alternating said network between high and low impedance states, the low impedance state occurring during the non-firing period of said reactors, and the high impedance state rendering said network substantially non-conductive and occurring during the firing period of said reactors.

5. A magnetic amplifier comprising two saturable reactors, each reactor including at least one load winding and a unidirectional current device connected in series therewith, said load windings being connected to a source of alternating current and said unidirectional devices being poled for supplying half-wave power to a load, a control winding wound in magnetic flux relation to each load winding, a source of control signal, switch means with symmetrical conductivity, a circuit including said switch means serially connected between said control windings and said source of control signal for supplying current from said signal source to said control windings in series, and means for actuating said switch means in synchronism with said alternating current source whereby to interrupt the flow of current through said control windings during the half-wave period when power is supplied to the load and whereby current flows from said source of control signal through said switch means and said control windings during the half-wave period when power is not supplied to the load.

6. A magnetic amplifier comprising a source of alternating current power, four load circuits, each load circuit including a load winding and a unidirectional current device connected serially thereto, said load circuits being arranged in a bridge to receive said alternating current at a pair of opposite bridge junctions and said unidirectional devices being poled for supplying half-wave power to a load connected between the remaining opposite pair of bridge junctions, a control winding wound in magnetic flux relationship to each pair of opposite load windings, a control circuit including in series a source of control signal, switch means with symmetrical conductivity and each of said control windings for supplying control current through said control windings in series, and means for actuating said switch means in synchronism with said alternating current source whereby to interrupt the flow of current in said control windings during the half-wave period when power is supplied to the load and whereby current flows from said source of control signal through said switch means and said control windings during the half-wave period when power is not supplied to the load.

7. A magnetic amplifier comprising two load circuits, each including a load winding and a unidirectional current device serially connected thereto, a transformer having a center tapped primary winding connected at either end to one of said load circuits and a secondary winding connected to a load, a source of alternating current power connected to said load windings and said primary winding center tap for supplying half-wave power to said load, a control winding wound in magnetic flux relation to each said load winding, a source of control signal, switch means serially connected between said control signal source and said control windings, and means for actuating said switch means in synchronism with said alternating current source whereby to interrupt the flow of current in said control windings during the half-wave period when power is supplied to the load and whereby current flows from said source of control signal through said switch means and said control windings during the half-wave period when power is not supplied to the load.

8. A magnetic amplifier comprising a source of alternating current power, two series connected load circuits each including a load winding and a unidirectional current device, said unidirectional current devices being arranged in like polarity, a transformer having its primary winding connected to said source of alternating current power and its secondary winding connected across said load circuits, said secondary winding having a center tap terminal for connection of a load between said terminal and the series junction of said two load circuits for supplying half-wave power to said load, a control winding wound in magnetic flux relation to each of said load winding, a source of control signal, switch means serially connected between said control signal source and said control windings, and means for actuating said switch means in synchronism with said alternating current source whereby to interrupt the flow of current in said control windings during the half-wave period when power is supplied to the load and whereby current flows from said source of control signal through said switch means and said control windings during the half-wave period when power is not supplied to the load.

9. A self-saturating magnetic amplifier including at least two saturable reactors connected to supply half-wave power to a load from an alternating current source and to fire during half cycles of like polarity, a control winding wound in magnetic flux relation to each said saturable reactor, said control windings being subject to having voltages induced therein during firing half cycles, a source of control signal, switch means having a conductive condition and a non-conductive condition, a circuit including in series said control windings, said switch means and said source of control signal whereby when said switch means is in its conductive condition, current flows from said source of control signals through said control windings in series, and when the switch means is in its non-conductive condition the switch means prevents the flow through said series circuit of circulating currents resulting from said induced voltages, and means for changing the condition of said switch means at the frequency of said alternating current source to render said switch non-conductive during each firing half cycle and conductive during intermediate half cycles.

10. A magnetic amplifier in accordance with claim 9 wherein said switch means comprises a relay-operated switch.

11. A magnetic amplifier in accordance with claim 9 wherein said switch means comprises a balanced diode bridge.

12. A magnetic amplifier in accordance with claim 9 wherein said switch means comprises a multi-segment rotatable commutator.

13. A magnetic amplifier comprising first and second saturable reactor branches, each including a reactor load winding and a unidirectional current device connected in series therewith for self-saturation, said load windings being connected to a source of alternating current and said unidirectional devices being poled to supply half-wave power to a load, a control winding wound in magnetic flux relation to each load winding, said control windings being subject to having voltages induced therein during the half wave period when power is supplied to the load, and a control circuit including in series a source of control signal, switch means, and each of said control windings for supplying control current through the control windings in series, said switch means being alternately conductive to said control signal during the half-wave period when power is not supplied to the load and non-conductive to current due to said voltages through said control windings during the half-wave period when power is supplied to the load.

14. A magnetic amplifier comprising an input circuit for connection to an A.C. source, an output circuit, first and second branches connected to supply power from the input circuit to the output circuit, each branch including a saturable reactor with a load winding and a unidirectional device in series with the load winding for self-saturation, said devices being poled so that both reactors fire on half cycles of like polarity, a control winding wound in magnetic flux relation to each said saturable reactor, a circuit including a source of control signal connected to said control windings to supply current to said windings in series, a network including a pair of linear resistances and a pair of non-linear resistances, said linear resistances being connected in series between said control signal and said control windings, said non-linear resistances being connected in shunt to said linear resistances, a source of reference signal having the same frequency as said power source and connected across the junctions intermediate said respective pairs of resistances for causing current flow therethrough only during each non-firing half-cycle of said reactors, whereby said control signal source supplies current to the control windings during non-firing half-cycles of the reactors and said network is rendered substantially non-conductive during each reactor firing half-cycle.

15. The magnetic amplifier of claim 14 wherein the non-linear resistances are oppositely poled unidirectional devices.

References Cited in the file of this patent
UNITED STATES PATENTS

| | | |
|---|---|---|
| 2,753,517 | Hooper | July 3, 1956 |
| 2,770,770 | Lufcy | Nov. 13, 1956 |

OTHER REFERENCES

"An Improved Magnet Servo Amplifier," by C. W. Lufcy et al., AIEE Transactions, vol. 71, Part I, September 1952, pp. 281–289.

"Fast Response With Magnetic Amplifiers," by D. G. Scorgie, NRL Report #4205, July 29, 1953.